(12) United States Patent
Ezawa et al.

(10) Patent No.: US 11,680,572 B2
(45) Date of Patent: Jun. 20, 2023

(54) VACUUM PUMP AND MAGNETIC BEARING CONTROLLER WITH MULTIPLE RIGIDITY MODES AT HIGH AND LOW GAINS

(71) Applicant: Edwards Japan Limited, Chiba (JP)

(72) Inventors: Yoshimasa Ezawa, Chiba (JP); Hideo Fukami, Chiba (JP); Kou Sato, Chiba (JP)

(73) Assignee: Edwards Japan Limited, Chiba (JP)

(*) Notice: Subject to any disclaimer, the term of this patent is extended or adjusted under 35 U.S.C. 154(b) by 25 days.

(21) Appl. No.: 16/640,990

(22) PCT Filed: Aug. 24, 2018

(86) PCT No.: PCT/JP2018/031269
§ 371 (c)(1),
(2) Date: Feb. 21, 2020

(87) PCT Pub. No.: WO2019/044674
PCT Pub. Date: Mar. 7, 2019

(65) Prior Publication Data
US 2021/0018005 A1    Jan. 21, 2021

(30) Foreign Application Priority Data
Aug. 31, 2017 (JP) .............................. JP2017-167896

(51) Int. Cl.
*F04D 19/04* (2006.01)
*F16C 32/04* (2006.01)

(52) U.S. Cl.
CPC ......... *F04D 19/048* (2013.01); *F04D 19/042* (2013.01); *F16C 32/0446* (2013.01); *F05D 2240/515* (2013.01)

(58) Field of Classification Search
None
See application file for complete search history.

(56) References Cited

U.S. PATENT DOCUMENTS 4,686,404 A * 8/1987 Nakazeki ............ F16C 32/0489
310/90.5
5,696,412 A * 12/1997 Iannello .............. F16C 32/0457
310/90.5
(Continued)

FOREIGN PATENT DOCUMENTS

EP    0313727 A1 * 5/1989 .......... F16C 32/0487
EP    0313727 A1    5/1989
(Continued)

OTHER PUBLICATIONS

Machine translation of JP3793856 merged with JP-3793856 attached, (Obtained from FIT database in USPTO Search). (Year: 2022).*
(Continued)

*Primary Examiner* — Essama Omgba
*Assistant Examiner* — Geoffrey S Lee
(74) *Attorney, Agent, or Firm* — Theodore M. Magee; Westman, Champlin & Koehler, P.A.

(57) ABSTRACT

A position deviation calculated by a subtractor of a vacuum pump is input to the PIDs of three modes. The first PID is a PID controller for a high-bias mode, the second PID is a PID controller for a high-rigidity mode, and the third PID is a PID controller for a low-rigidity mode. The output signal of the third PID is extracted as a change of an indicator current for each clock of a PWM frequency and then the mean value of a change of an indicator current for several clocks is determined in a calculating unit. At this point, a switching control unit performs an operation on whether the mean value of the averaged change of the indicator current is larger than a preset redetermined value and then according to the result, an α value is outputted in the range of 0 to 1 from the switching control unit.

5 Claims, 7 Drawing Sheets

(56) References Cited

U.S. PATENT DOCUMENTS

| | | | | |
|---|---|---|---|---|
| 7,053,582 | B2* | 5/2006 | Ueyama | H02K 7/09 |
| | | | | 318/632 |
| 2004/0041478 | A1* | 3/2004 | Ohtachi | F16C 32/0444 |
| | | | | 310/90.5 |
| 2004/0070358 | A1* | 4/2004 | Yamada | F16F 15/18 |
| | | | | 318/560 |
| 2016/0290351 | A1* | 10/2016 | Kawashima | F04D 19/042 |
| 2017/0110930 | A1* | 4/2017 | Kozaki | F16C 32/0451 |
| 2021/0018005 | A1* | 1/2021 | Ezawa | F04D 19/042 |

FOREIGN PATENT DOCUMENTS

| | | | | | |
|---|---|---|---|---|---|
| JP | F1037958 | A | | 2/1998 | |
| JP | 2000074062 | A | * | 3/2000 | F16C 32/0444 |
| JP | 2000074062 | A | | 3/2000 | |
| JP | 2000283159 | A | * | 10/2000 | F16C 32/0451 |
| JP | 2000283159 | A | | 10/2000 | |
| JP | 2004150628 | A | | 5/2004 | |
| JP | 2004270778 | A | * | 9/2004 | F16C 32/0444 |
| JP | 2005502004 | A | | 1/2005 | |
| JP | 2005290998 | A | | 10/2005 | |
| JP | 3793856 | B2 | * | 7/2006 | F16C 32/0442 |
| JP | 2008136354 | A | | 6/2008 | |
| JP | 2013130180 | A | | 7/2013 | |
| JP | 2014110653 | A | | 6/2014 | |

OTHER PUBLICATIONS

Machine translation of 2004270778-A merged with 2004270778-A attached, (Obtained from FIT database in USPTO Search). (Year: 2022).*
Definition of Several (Obtained from https://www.merriam-webster.com/dictionary/several? Aug. 24, 2022 ) (Year: 2022).*
PCT International Search Report dated Nov. 13, 2018 for corresponding PCT Application No. PCT/JP2018/031269.
PCT International Written Opinion dated dated Nov. 13, 2018 for corresponding PCT Application No. PCT/JP2018/031269.
European Communication dated Apr. 29, 2021 for corresponding European application Serial No. 18851537.3, 13 pages.

* cited by examiner

| Acronym | Name | Objective | Control Gain | Steady-State Current |
|---|---|---|---|---|
| LRM (Low Rigidity Mode) | Low-Rigidity Mode | Small control Gain and Small steady-state current for low vibrations | Low | Low |
| HRM (High Rigidity Mode) | High-Rigidity Mode | Large control Gain and Improved response to external disturbance | High | ↑ |
| HBM (High Bias Mode) | High-Bias Mode | Regenerated energy consumption during braking with load of electromagnetic coil | ↑ | High |

FIG. 5

VACUUM PUMP AND MAGNETIC BEARING CONTROLLER WITH MULTIPLE RIGIDITY MODES AT HIGH AND LOW GAINS

CROSS-REFERENCE OF RELATED APPLICATION

This application is a Section 371 National Stage Application of International Application No. PCT/JP2018/031269, filed Aug. 24, 2018, which is incorporated by reference in its entirety and published as WO 2019/044674 A1 on Mar. 7, 2019 and which claims priority of Japanese Application No. 2017-167896, filed Aug. 31, 2017.

BACKGROUND

The present invention relates to a vacuum pump and a controller and particularly relates to a vacuum pump and a controller that can perform accurate and stable control during a steady operation, are resistant to disturbance, and achieve a short pump stop time and size reduction.

In response to recent development of electronics, demand for semiconductors, e.g., memory and integrated circuits has grown sharply.

Such a semiconductor is manufactured by, for example, doping a semiconductor substrate of extremely high purity with an impurity so as to exhibit electrical properties or forming a fine circuit on a semiconductor substrate by etching.

It is necessary to perform these operations in a high-vacuum chamber in order to avoid the influence of dust or the like in the air. For evacuation of such a chamber, a vacuum pump is typically used. In particular, a turbo molecular pump, a kind of vacuum pump, is frequently used because of a small amount of residual gas and ease of maintenance.

A process of manufacturing semiconductors includes many steps of actions of process gas on semiconductor substrates. A turbo molecular pump is used for the exhaust of process gas from a chamber as well as the evacuation of the chamber.

Furthermore, in order to prevent, for example, refraction of an electron beam in the presence of dust or the like in the facility of, for example, an electron microscope, a turbo molecular pump is used for evacuating the environment in the chamber of the electron microscope to a high degree of vacuum.

The turbo molecular pump includes a magnetic bearing device for magnetic levitation control on a rotating body. Moreover, in the magnetic bearing device, it is necessary to control the position of the rotating body with a strong force at high speed during passage through a resonance point in an acceleration operation of the rotating body.

FIG. 7 illustrates an example of conventional magnetic bearing control. In FIG. 7, the radial position of a rotor shaft 113 is detected by radial position sensors 107 and 108. A radial position signal detected by the radial position sensors 107 and 108 and a displacement command value $X_0$ are input to a subtractor 1 and a deviation is calculated by the subtractor 1. The deviation signal is adjusted by a PID 2 and then is added to a predetermined steady-state current by an adder 3. The added signal is then input to a switching unit 4. A signal A outputted from the switching unit 4 is amplified at a high voltage of about 50 V by an amplifier circuit 5 and then a current is fed to the electromagnetic windings of radial electromagnets 104 and 105 through a mixer 6. The current passing through the electromagnetic windings is detected by a current sensing circuit 7 and then is returned to the input side of the amplifier circuit 5 so as to be adjusted.

The deviation signal calculated by the subtractor 1 is also input to a PID 12. The signal is adjusted by the PID 12 and then is added to the predetermined steady-state current by the adder 13. The added signal is then input to the switching unit 4. A signal B outputted from the switching unit 4 is amplified at a low voltage of about 15 V by an amplifier circuit 15 and then a current is fed to the electromagnetic windings of the radial electromagnets 104 and 105 through the mixer 6. The current passing through the electromagnetic windings is detected by the current sensing circuit 7 and then is returned to the input side of the amplifier circuit 15 so as to be adjusted.

As described above, a high voltage of about 50 V for quickly increasing current passing through the electromagnetic windings is used as a power supply in addition to a low voltage of about 15 V during a normal operation.

In the switching unit 4, switching control is performed between the supply of power from a high-voltage power supply by detecting a rate of change of current passing through the electromagnetic windings (hereinafter, will be referred to as a high-voltage mode) and the supply of power from a low-voltage power supply (hereinafter, will be referred to as a low-voltage mode).

In other words, an operation is performed in the low-voltage mode when a low-vibration operation is necessary, whereas an operation is performed in the high-voltage mode when disturbance may occur. Thus, the rotating body is protected in the event of sudden disturbance (Japanese Patent Application Publication No. 2004-286045).

Furthermore, a conventional small pump consumes regenerated power with electromagnets. This eliminates the need for a regenerative resistor and a peripheral circuit thereof, achieving space saving and a reduction of cost (see Japanese Patent Application Publication No. 2014-110653).

The discussion above is merely provided for general background information and is not intended to be used as an aid in determining the scope of the claimed subject matter. The claimed subject matter is not limited to implementations that solve any or all disadvantages noted in the background.

SUMMARY

The provision of two kinds of power supplies and two kinds of amplifier circuits interfere with the size reduction and power saving of the controller. Moreover, one of the power supplies and one of the amplifier circuits have larger standby power because a circuit for driving the electromagnets is not operated.

Furthermore, a rate of change of the current passing through the electromagnetic windings is detected by actual measurement, which may be affected by noise and cause a delay in control response.

In addition, the regenerative resistor is typically connected to consume the regenerated power of the motor of the turbo molecular pump. The controller can be further reduced in size by omitting the regenerative resistor. However, the omission of the regenerative resistor may increase a braking time until the motor is stopped.

In order to avoid the problem, the braking time may be reduced by consuming energy through the electromagnetic windings of a magnetic bearing as described in Japanese Patent Application Publication No. 2014-110653. However, the installation of an independent control circuit for such control may increase the cost.

Moreover, in the technique of Japanese Patent Application Publication No. 2014-110653, only one value is set for the steady-state current (bias current). Thus, it is necessary to also increase the bias current during stationary floating and startup, which may disadvantageously generate heat. If the bias current is reduced, a light load may occur during regeneration and thus it is assumed that the braking time is increased.

The present invention has been devised in view of the conventional problems. An object of the present invention is to provide a vacuum pump and a controller that can perform accurate and stable control during a steady operation, are resistant to disturbance, and achieve a short pump stop time and size reduction.

Thus, the present invention is an invention of a vacuum pump. The vacuum pump includes: a rotating body supported and floated in the air by an electromagnet; a position sensor that detects the radial or axial position of the rotating body; and an excitation control circuit that controls excitation of the electromagnet so as to set the rotating body at a predetermined position, wherein the excitation control circuit has at least two kinds of excitation control modes, selects the excitation control mode according to a difference between the position detected by the position sensor and a displacement command value or an operation command, and gradually or instantly switches the mode according to a ratio in the selected excitation control mode.

Moreover, the present invention is an invention of a vacuum pump. The vacuum pump includes: a rotating body supported and floated in the air by an electromagnet; a position sensor that detects the radial or axial position of the rotating body; and a subtractor that computes a difference between the position detected by the position sensor and a displacement command value; high-rigidity-mode adjusting means that adjusts the output of the subtractor to high rigidity; low-rigidity-mode adjusting means that adjusts the output of the subtractor to low rigidity; output-signal adding means that adds the output signal of the low-rigidity-mode adjusting means and the output signal of the high-rigidity-mode adjusting means; and amplifying means that amplifies the output signals added by the output signal adding means, wherein current is passed through a winding of the electromagnet based on the output signal amplified by the amplifying means, and the signal adjusted by the high-rigidity-mode adjusting means and the signal adjusted by the low-rigidity-mode adjusting means are adjusted based on a first ratio.

Since the output signal of the low-rigidity-mode adjusting means and the output signal of the high-rigidity-mode adjusting means are added and input to the amplifying means, only the single amplifying means is necessary. The amplifying means can be driven by one kind of direct-current power supply. This achieves size reduction and power savings of a device. Moreover, the signal adjusted by the high-rigidity-mode adjusting means and the signal adjusted by the low-rigidity-mode adjusting means are adjusted by software based on the first ratio, achieving a simple method of addition.

Furthermore, the present invention is an invention of a vacuum pump. The vacuum pump includes signal extracting means that extracts the signal adjusted by the low-rigidity-mode adjusting means, wherein the first ratio is set based on the signal extracted by the signal extracting means.

The signal adjusted by the low-rigidity-mode adjusting means is extracted and the first ratio is set based on the signal. This eliminates, unlike in the related art, the influence of noise caused by detecting a rate of change of current passing through electromagnetic windings by actual measurement, and a delay in control response.

Moreover, the present invention is an invention of a vacuum pump. The vacuum pump includes signal change determining means that determines whether a change of the signal extracted by the signal extracting means is equal to or larger than a preset predetermined value, wherein if the signal change determining means determines that the change of the signal is equal to or larger than the preset predetermined value, switching is performed from an adjustment by the low-rigidity-mode adjusting means to an adjustment by the high-rigidity-mode adjusting means in a time period several times as long as the clock width of a pulse width modulation (PWM) frequency.

When a change of the signal extracted by the signal extracting means is equal to or larger than the preset predetermined value, it is determined that disturbance has affected the signal. In this case, switching is performed from the adjustment by the low-rigidity-mode adjusting means to the adjustment by the high-rigidity-mode adjusting means in a time period several times as long as the clock width of the pulse width modulation (PWM) frequency.

This can quickly suppress the disturbance.

Furthermore, the present invention is an invention of a vacuum pump. The change of the signal in the signal change determining means is based on one of a current command value for the current passing through the winding of the electromagnet, a fluctuation of the current command value, and the mean value of a change of an indicator current in a period of at least the clock width.

Moreover, the present invention is an invention of a vacuum pump. The vacuum pump further includes high-bias-mode adjusting means that adjusts the output of the subtractor to a high bias when a braking signal of the rotating body is input, wherein a signal adjusted by the high-bias-mode adjusting means and the output signal added by the output signal adding means are adjusted based on a second ratio and the adjusted signals are input to the amplifying means.

Since the signal adjusted by the high-bias-mode adjusting means and the output signal added by the output signal adding means are adjusted based on the second ratio and the adjusted signals are input to the amplifying means, only the single amplifying means is necessary. The amplifying means can be driven by one kind of direct-current power supply. This achieves size reduction and power savings of a device. A regenerative resistor can be omitted and thus further size reduction is achieved. The signal adjusted by the high-bias-mode adjusting means is adjusted based on the second ratio, thereby shortening a braking time.

Furthermore, the present invention is an invention of a vacuum pump. The first ratio and the second ratio are changed in the range of 0 to 1 with the passage of time, and switching is slowly performed for several seconds from the adjustment by the high-rigidity-mode adjusting means to the adjustment by the low-rigidity-mode adjusting means or from the adjustment by the high-rigidity-mode adjusting means or the adjustment by the low-rigidity-mode adjusting means to the adjustment by the high-bias-mode adjusting means.

Since the first ratio and the second ratio are slowly changed, stable control is achieved.

Moreover, the present invention is an invention of a vacuum pump. The signal adjusted by the high-rigidity-mode adjusting means is generated by adding a steady-state current set for high bias to a signal that is outputted from the subtractor and is PID-controlled, the signal adjusted by the low-rigidity-mode adjusting means is generated by adding a steady-state current set for low rigidity to a signal that is outputted from the subtractor and is PID-controlled, and the signal adjusted by the high-bias-mode adjusting means is generated by adding a steady-state current set for high bias to a signal that is outputted from the subtractor and is PID-controlled.

The steady-state currents suitable for the respective modes are applied, achieving stable control.

Furthermore, the present invention is an invention of a vacuum pump. The magnitude relationship among the steady-state currents is set such that the steady-state current set for low rigidity is at most the steady-state current set for high rigidity and the steady-state current set for high rigidity is smaller than the steady-state current set for high bias.

The large steady-state current is set for high bias, so that regenerated energy during braking can be consumed with the loads of the electromagnetic windings.

Moreover, the present invention is an invention of a controller. The controller includes the subtractor, the high-rigidity-mode adjusting means, the low-rigidity-mode adjusting means, the output signal adding means, and the amplifying means that are described for the vacuum pump according to any one of claims 2 to 9.

As described above, since the output signal of the low-rigidity-mode adjusting means and the output signal of the high-rigidity-mode adjusting means are added and input to the amplifying means, only the single amplifying means is necessary. The amplifying means can be driven by one kind of direct-current power supply. This achieves size reduction and power savings of the device. Moreover, the signal adjusted by the high-rigidity-mode adjusting means and the signal adjusted by the low-rigidity-mode adjusting means are adjusted by software based on the first ratio, achieving a simple method of addition.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

FIG. 5 indicates the relationship between a control gain and a steady-state current in the three modes;

DESCRIPTION OF THE PREFERRED EMBODIMENTS

Figure 1:
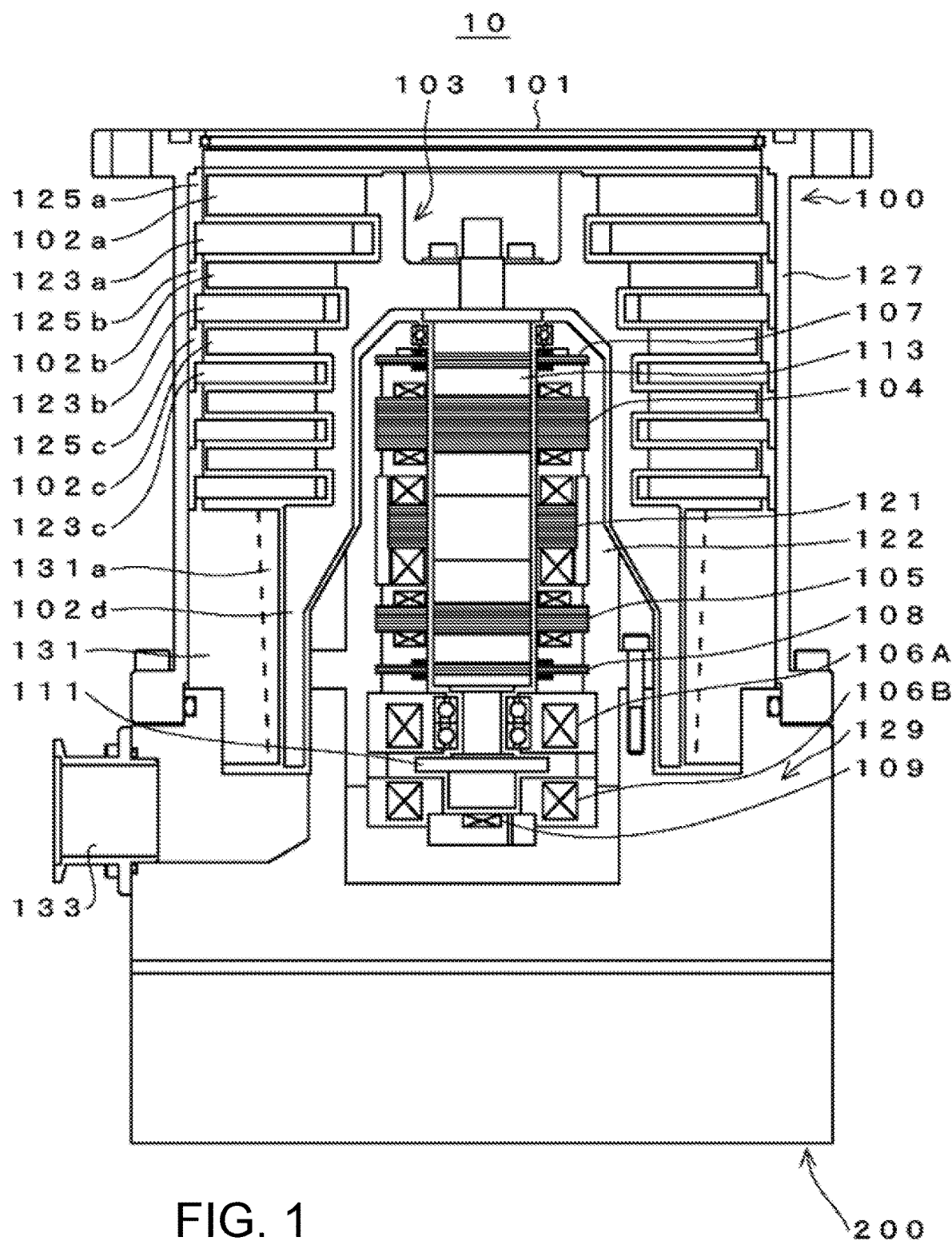
FIG. 1 is a block diagram of a turbo molecular pump.

An embodiment of the present invention will be described below. FIG. 1 is a block diagram of a turbo molecular pump.

In FIG. 1, an inlet port 101 is formed on the upper end of a cylindrical outer casing 127 of a pump body 100. The outer casing 127 includes a rotating body 103 having a plurality of rotor blades 102a, 102b, 102c . . . that are radially and circumferentially formed in multiple stages. The rotor blades are turbine blades for sucking and exhausting gas.

A rotor shaft 113 is attached to the center of the rotating body 103. The rotor shaft 113 is supported and floated in the air by, for example, a so-called five-axis control magnetic bearing under position control.

An upper radial electromagnet 104 includes four electromagnets that are disposed in pairs along the X axis and the Y axis that are orthogonal to each other. The X axis and the Y axis are the radial coordinate axes of the rotor shaft 113. An upper radial sensor 107 corresponding to the upper radial electromagnet 104 is provided with four electromagnets near the upper radial electromagnet 104. The upper radial sensor 107 is configured to detect a radial displacement of the rotor shaft 113 and transmit the displacement to a controller 200.

The controller 200 controls the excitation of the upper radial electromagnet 104 through a compensation circuit, which has a PID regulating function, based on a displacement signal detected by the upper radial sensor 107 and adjusts the upper radial position of the rotor shaft 113. A control loop (corresponding to an excitation control circuit) including the compensation circuit will be described later.

The rotor shaft 113 is made of a high-permeability material (e.g., iron) and is attracted by a magnetic force of the upper radial electromagnet 104. The adjustment is made in each of the X-axis direction and the Y-axis direction.

Moreover, a lower radial electromagnet 105 and a lower radial sensor 108 are disposed like the upper radial electromagnet 104 and the upper radial sensor 107. The lower radial position of the rotor shaft 113 is adjusted as the upper radial position.

Furthermore, axial electromagnets 106A and 106B are disposed to vertically hold a disc-shaped metal disc 111 provided in the lower part of the rotor shaft 113. The metal disc 111 is made of a high-permeability material, e.g., iron. An axial sensor 109 is provided to detect an axial displacement of the rotor shaft 113 and is configured to transmit an axial displacement signal to the controller 200.

The excitation of the axial electromagnets 106A and 106B is controlled based on the axial displacement signal through the compensation circuit having the PID regulating function in the controller 200. A control loop including the compensation circuit will be described later. The axial electromagnet 106A and the axial electromagnet 106B attract the metal disc 111 with a magnetic force in an upward direction and a downward direction, respectively.

In this way, the controller 200 properly regulates a magnetic force applied to the metal disc 111 by the axial electromagnets 106A and 106B, magnetically floats the rotor shaft 113 in the axial direction, and holds the rotor shaft 113 in a space in a noncontact manner.

The motor 121 has a plurality of magnetic poles circumferentially disposed around the rotor shaft 113. The magnetic poles are controlled by the controller 200 so as to rotate the rotor shaft 113 with an electromagnetic force applied between the magnetic poles and the rotor shaft 113.

A plurality of stator blades 123a, 123b, 123c . . . are disposed at small spacings between the rotor blades 102a, 102b, 102c . . . . The rotor blades 102a, 102b, 102c . . . transfer molecules of exhaust gas downward by collision and thus are formed at an inclination of a predetermined angle from a plane perpendicular to the axis of the rotor shaft 113.

The stator blades 123 are also formed at the inclination of the predetermined angle from the plane perpendicular to the axis of the rotor shaft 113. The stator blades 123 and the rotor blades 102 are alternately disposed inside the outer casing 127.

One ends of the stator blades 123 are supported while being inserted between stator blade spacers 125a, 125b, 125c . . . that are disposed in multiple stages.

The stator blade spacer 125 is a ring-shaped member that is made of, for example, metals such as aluminum, iron, stainless, and copper or metals such as an alloy of these metals.

Around the stator blade spacer 125, the outer casing 127 is fixed with a small clearance. At the bottom of the outer casing 127, a base part 129 is disposed. Between the bottom of the stator blade spacer 125 and the base part 129, a threaded spacer 131 is disposed. At the bottom of the threaded spacer 131 in the base part 129, an outlet port 133 is formed and communicates with the outside.

The threaded spacer 131 is a cylindrical member that is made of, for example, metals such as aluminum, copper, stainless, and iron or an alloy of these metals. A plurality of spiral thread grooves 131a are formed on the inner surface of the threaded spacer 131.

The spiral direction of the thread groove 131a is a direction along which molecules of exhaust gas are transferred to the outlet port 133 when the molecules move in the rotation direction of the rotating body 103.

A cylindrical part 102d is hung from the lowermost part of the rotating body 103, the lowermost part being continued from the rotor blades 102a, 102b, 102c . . . . The cylindrical part 102d has a cylindrical outer surface that projects toward the inner surface of the threaded spacer 131 and is placed close to the inner surface of the threaded spacer 131 with a predetermined clearance.

The base part 129 is a disc-shaped member that constitutes the base of the turbo molecular pump 10 and is typically made of metals such as iron, aluminum, and stainless.

The base part 129 physically holds the turbo molecular pump 10 and has the function of a heat conduction path and thus is desirably made of metals such as iron, aluminum, and copper that have rigidity and high thermal conductivity.

In this configuration, when the rotor blades 102 are driven by the motor 121 and rotate with the rotor shaft 113, exhaust gas is sucked from a chamber through the inlet port 101 by the actions of the rotor blades 102 and the stator blades 123.

Exhaust gas sucked from the inlet port 101 passes between the rotor blades 102 and the stator blades 123 and then is transferred to the base part 129. At this point, the temperature of the rotor blades 102 is increased by the conduction and radiation of heat generated by the motor 121 or frictional heat generated when exhaust gas comes into contact with or collides with the rotor blades 102. The heat is transferred to the stator blades 123 by radiation or conduction with the gas molecules of exhaust gas.

The stator blade spacers 125 are bonded to each other on the outer edges. Heat transferred to the outer casing 127 and the threaded spacers 131 is heat received by the stator blades 123 from the rotor blades 102 or frictional heat generated when exhaust gas comes into contact with or collides with the stator blades 123.

Exhaust gas transferred to the threaded spacers 131 is conveyed to the outlet port 133 while being guided by the thread grooves 131a.

Figure 2:
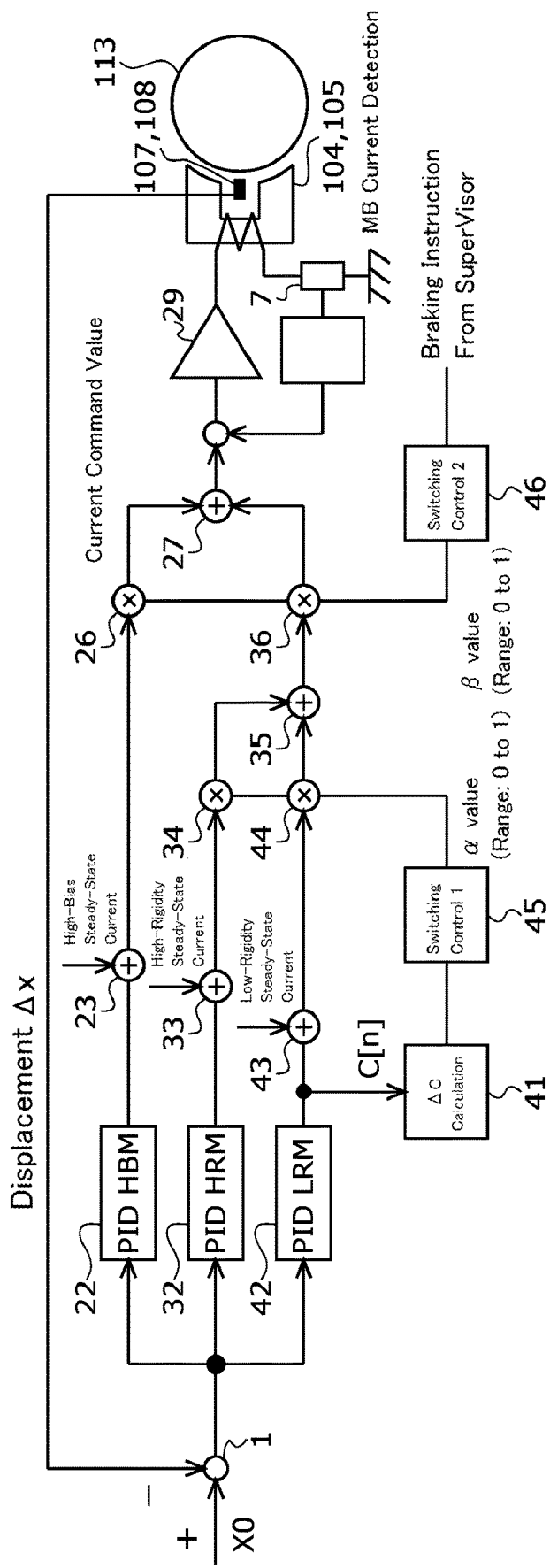
FIG. 2 is a block diagram illustrating the switching of rigidity during control according to the present invention.
Figure 7:
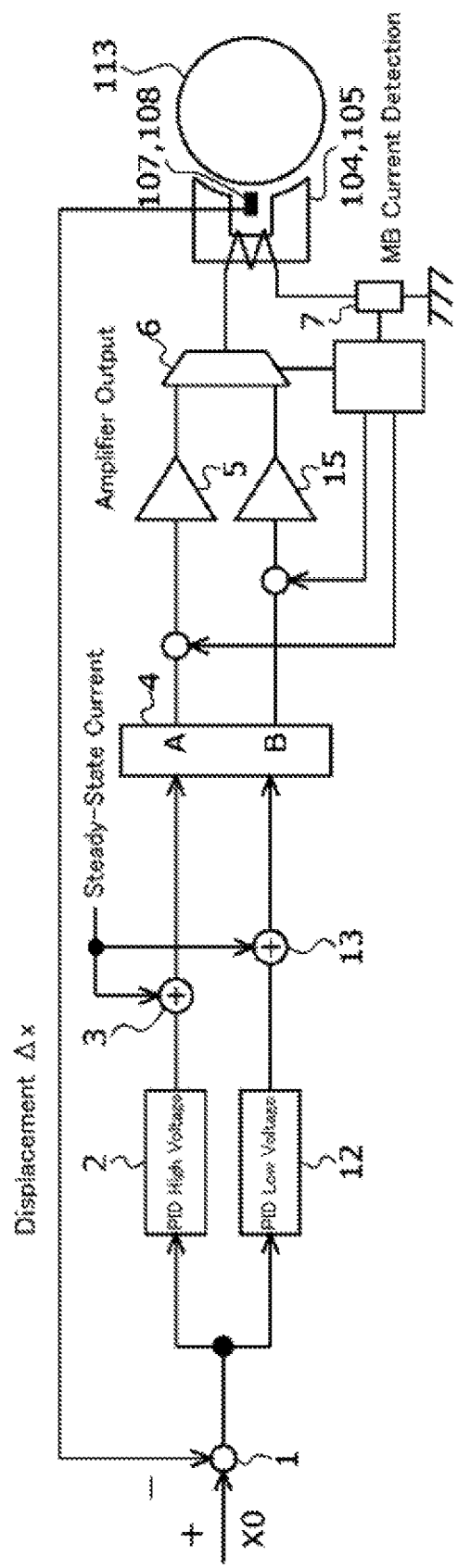
FIG. 7 illustrates an example of conventional magnetic bearing control.

A method of switching rigidity (corresponding to an excitation control mode for the electromagnets) during control according to the present invention will be described below. FIG. 2 is a block diagram illustrating the switching of rigidity. The same elements as those of FIG. 7 are indicated by the same reference numerals and an explanation thereof is omitted.

The block diagram of the switching of rigidity embodies control based on Expression 1. Expression 1 means that the values of $\alpha$ and $\beta$ are computed by detecting large disturbance or a braking state and a current command value is calculated based on the values.

$$\text{Current command value}=(1-\beta)\times(\alpha\times\text{low-rigidity current command value}+(1-\alpha)\times\text{high-rigidity current command value})+\beta\times\text{high-bias current command value} \quad \text{Expression 1}$$

In the Expression 1, $\alpha$ corresponds to the ratio between the low-rigidity current command value and the high-rigidity current command value, and $\beta$ corresponds to the ratio between the addition result of the low-rigidity current command value and the high-rigidity current command value and the high-bias current command value.

In the block diagram of the switching of rigidity in FIG. 2, a position deviation calculated by a subtractor 1 is input to PIDs 22, 32, and 42 of three modes. The PID 22 is a PID controller that corresponds to high-bias-mode adjusting means and is provided for a high-bias mode, the PID 32 is a PID controller that corresponds to high-rigidity-mode adjusting means and is provided for a high-rigidity mode, and the PID 42 is a PID controller that corresponds to low-rigidity-mode adjusting means and is provided for a low-rigidity mode. A signal regulated in the PID 22 is added to a high-bias steady-state current, which will be described later, in an adder 23 and is outputted as a high-bias indicator current from the adder 23. Moreover, a signal regulated in the PID 32 is added to a high-rigidity steady-state current, which will be described later, in an adder 33 and is outputted as a high-rigidity indicator current from the adder 33. Furthermore, a signal regulated in the PID 42 is added to a low-rigidity steady-state current, which will be described later, in an adder 43 and is outputted as a low-rigidity indicator current from the adder 43.

Subsequently, the output signal of the PID 42 is extracted as a change of the indicator current for each clock of a pulse width modulation (PWM) frequency and then a mean value ΔC of a change of the indicator current for one to several clocks is determined in a calculating unit 41. At this point, a switching control unit 45 performs an operation on whether the mean value ΔC of the averaged change of the indicator current is larger than a preset redetermined value and then according to the result, an a value corresponding to a first ratio is outputted in the range of 0 to 1 from the switching control unit 45. The change of the indicator current may not be averaged and a value for each clock may be used instead.

In the conventional control in FIG. 7, switching control is performed between the high-voltage mode and the low-voltage mode in the switching unit 4 by detecting a rate of change of current passing through the electromagnetic windings, whereas in the present invention, the mean value ΔC of a change of the indicator current is detected by software, eliminating the influence of noise and a phase delay. Thus, switching can be performed with quick response.

Based on the $\alpha$ value computed in a switching control unit 45, a multiplier 34 multiplies the high-rigidity indicator current by (1−α) times. Moreover, a multiplier 44 multiplies the low-rigidity indicator current by a times.

The output signal of the multiplier 34 and the output signal of the multiplier 44 are added by an adder 35 corresponding to output-signal adding means.

When a braking instruction is outputted from a monitoring device (SuperVisor), which is not illustrated, the value corresponding to a second ratio is computed in a switching control unit 46 and then is outputted in the range of 0 to 1.

Based on the β value computed in the switching control unit 46, the high-bias indicator current is multiplied by β times in the multiplier 26. Moreover, the output signal of the adder 35 is multiplied by (1–β) times in the multiplier 36. The output signal of a multiplier 26 and the output signal of a multiplier 36 are added by an adder 27. The output of the adder 27 corresponds to the current command value of Expression 1. The signals added by the adder 27 are input to an amplifier circuit 29 corresponding to amplifying means. The amplifier circuit 29 is driven by a kind of direct-current power supply.

Figure 3:
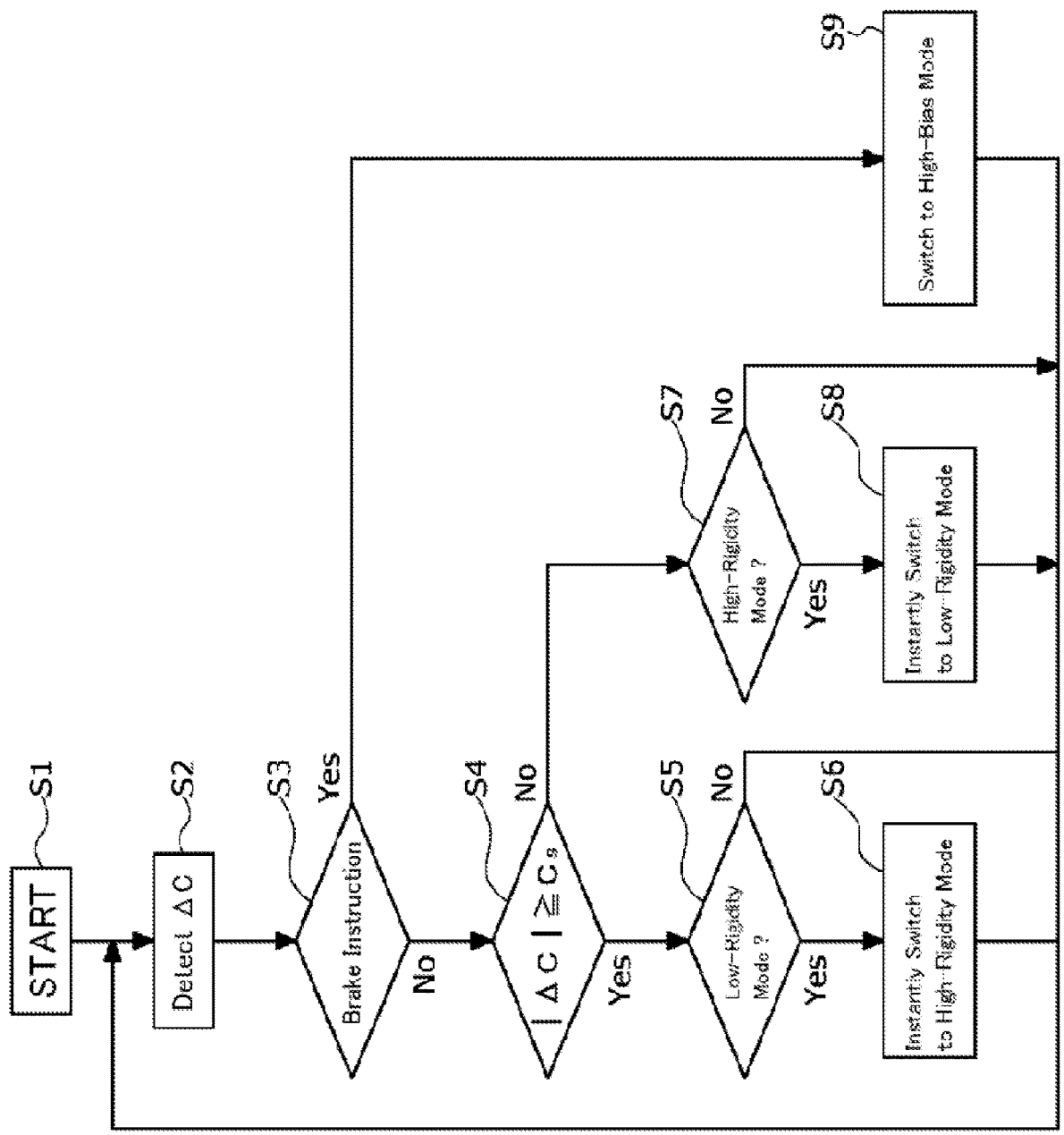
FIG. 3 is a flowchart illustrating processing for switching rigidity according to the present invention.
Figure 4:
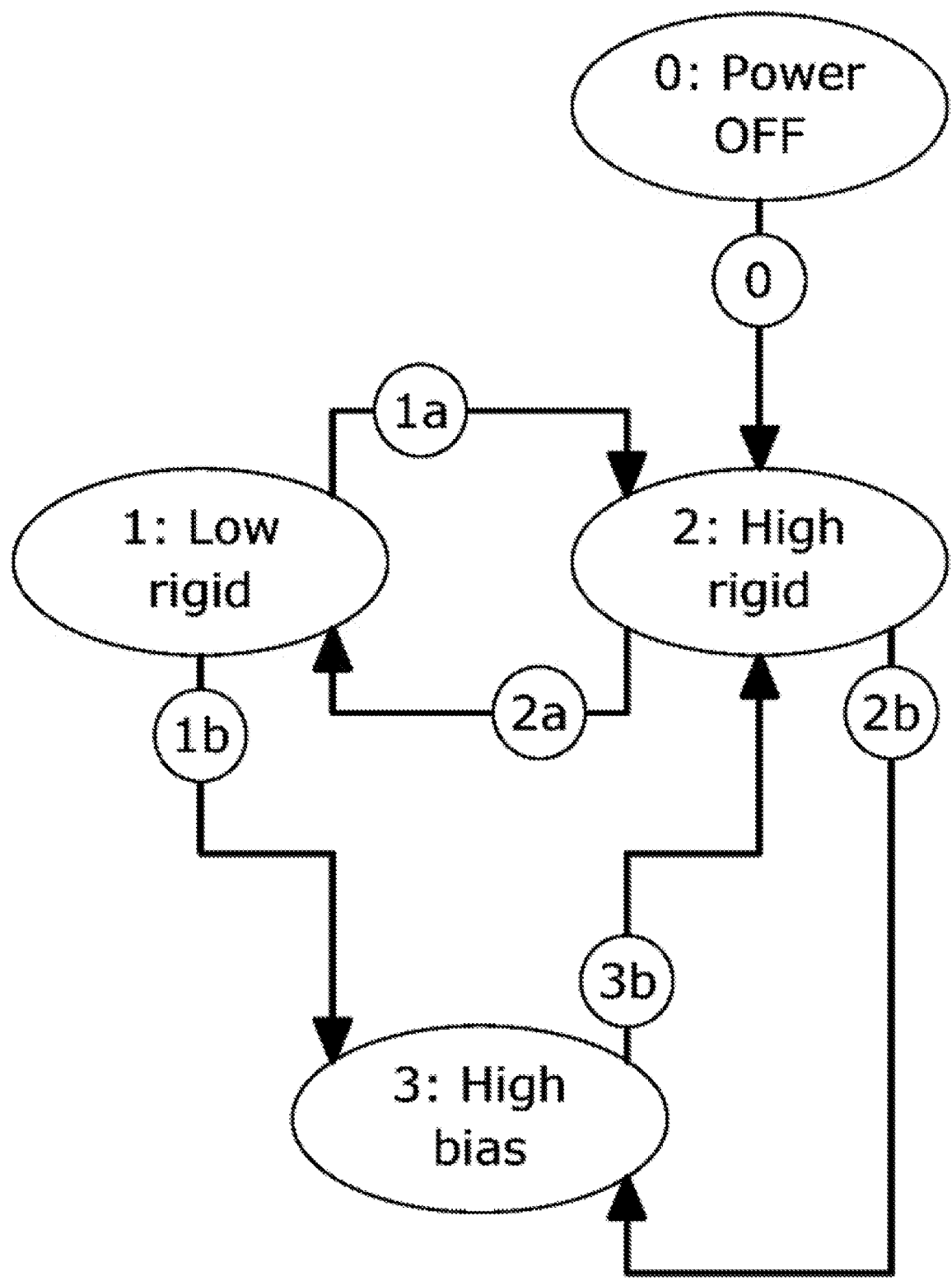
FIG. 4 is a state transition diagram among a low-rigidity mode, a high-rigidity mode, and a high-bias mode.

FIG. 3 is a flowchart illustrating processing for switching rigidity according to the present invention. FIG. 4 is a state transition diagram among the low-rigidity mode, the high-rigidity mode, and the high-bias mode.

In step 1 of FIG. 3 (referred to as S1 in FIG. 3), the processing is started by turning on the power of the system. Immediately after the power is turned on, the process shifts to the high-rigidity mode (2: High bias) as indicated by the state transition diagram of FIG. 4 (a transition denoted as the reference 0 in FIG. 4).

Immediately after the stationary floating in the high-rigidity mode (2: High rigid), a state transition is gradually made from the high-rigidity mode to the low-rigidity mode (1: Low rigid) in several seconds in the absence of disturbance such that the rotating body is stably supported at a normal floating position (a transition denoted as the reference 2a in FIG. 4). The several seconds are set at, for example, one to ten seconds (also hereafter). In this case, β is set at 0 and α is gradually switched from 0 to 1.

At the completion of the operation at the startup in step 1 of FIG. 3, the process advances to step 2 and the mean value ΔC of a change of the indicator current is detected for each clock of a PWM frequency. In step 3, the presence or absence of the braking instruction is determined. In the absence of the braking instruction, the process advances to step 4 and the switching control unit 45 determines whether the mean value ΔC of a change of the indicator current is equal to or larger than a preset predetermined value $C_S$. If the mean value ΔC of a change of the indicator current is equal to or larger than the preset predetermined value $C_S$, it is determined that disturbance is present. The process then advances to step 5 to determine whether the current state is placed in the low-rigidity mode.

When the current state is placed in the low-rigidity mode, the process advances to step 6 so as to quickly switch to the high-rigidity mode (a transition denoted as the reference 1a in FIG. 4). At this point, α is quickly switched from 1 to 0 while β is kept at 0. A switching time at this point will be described later. If the current state is not placed in the low-rigidity mode in step 5, the current state is maintained. The process returns to step 2 to detect the mean value ΔC of a change of the indicator current.

If the mean value ΔC of a change of the indicator current is smaller than the preset predetermined value $C_S$ in step 4, the process advances to step 7 to determine whether the current state is placed in the high-rigidity mode. If the mean value ΔC of a change of the indicator current is smaller than the preset predetermined value $C_S$, disturbance is absent and a stable operation can be performed. Thus, the process advances to step 8 when the current state is placed in the high-rigidity mode. The mode is gradually switched to the low-rigidity mode for several seconds (a transition denoted as the reference 2a in FIG. 4). At this point, β is kept at 0 and α is gradually switched from 0 to 1.

If the current state is not placed in the high-rigidity mode in step 7, the current state is maintained. The process returns to step 2 to detect the mean value ΔC of a change of the indicator current.

If the braking instruction is provided in step 3, the process advances to step 9 to switch to the high-bias mode. If the braking instruction is provided during an operation in the low-rigidity mode, the mode is gradually switched to the high-bias mode for several seconds (a transition denoted as the reference 1b in FIG. 4). At this point, β is gradually switched from 0 to 1.

If the braking instruction is provided during an operation in the high-rigidity mode, the mode is gradually switched to the high-bias mode in several seconds (a transition denoted as the reference 2b in FIG. 4). At this point, β is gradually switched from 0 to 1.

Once the state is placed into the high-bias mode, the high-bias mode cannot be abruptly switched to the low-rigidity mode even if the braking instruction is not provided. It is necessary to make a transition from the high-bias mode to the low-rigidity mode through the high-rigidity mode (transitions denoted as the references 3b and 2a in FIG. 4). At a transition from the high-bias mode to the high-rigidity mode, α is set at 0 and β is gradually switched from 1 to 0. The processing is performed because a sudden transition from the high-bias mode to the low-rigidity mode may not suppress disturbance.

Moreover, β=0 corresponds to the modes other than the high-bias mode, Expression 1 is simplified as Expression 2, and the low-rigidity current command value and the high-rigidity current command value with a predetermined ratio act on the current command value.

$$\text{Current command value} = \alpha \times \text{low-rigidity current command value} + (1-\alpha) \times \text{high-rigidity current command value} \quad \text{Expression 2}$$

Furthermore, in the case of 0<β≤1, a transition is being made to the high-bias mode. When β=1 is obtained, Expression 1 is simplified as Expression 3 and only the current command value acts on the current command value.

$$\text{Current command value} = \text{high-bias current command value} \quad \text{Expression 3}$$

The relationship between a control gain and a steady-state current in the high-bias mode, the high-rigidity mode, and the low-rigidity mode will be described below. FIG. 5 indicates the relationship between a control gain and a steady-state current in the three modes.

The low-rigidity mode is suitable for performing control during low vibrations with a small control gain and a small steady-state current. The high-rigidity mode is a mode for increasing the control gain and improving response to disturbance. The high-bias mode is a mode for consuming regenerated energy during braking with the loads of the electromagnetic windings of radial electromagnets 104 and 105 and an axial electromagnet 106.

Expression 4 indicates the magnitude relationship among the control gains.

$$LRM < HBM \leq HRM \quad \text{Expression 4}$$

As is evident from FIG. 5, the control gain of the high-rigidity mode is set higher than that of the high-bias mode. This is because if the steady-state current and the control gain are increased in the high-bias mode, oscillations may occur and lead to unstable control.

Expression 5 indicates the magnitude relationship among the steady-state currents.

$$LRM \leq HRM < HBM \qquad \text{Expression 5}$$

The smaller the steady-state current and the control gain, the lower the vibrations of the pump. The pump decreases in bearing rigidity and thus becomes unstable in the event of large disturbance. For example, a high-bias steady-state current is set at about 0.85 A, a high-rigidity steady-state current is set at about 0.5 A, and a low-rigidity steady-state current is set at about 0.4 A.

Figure 6:
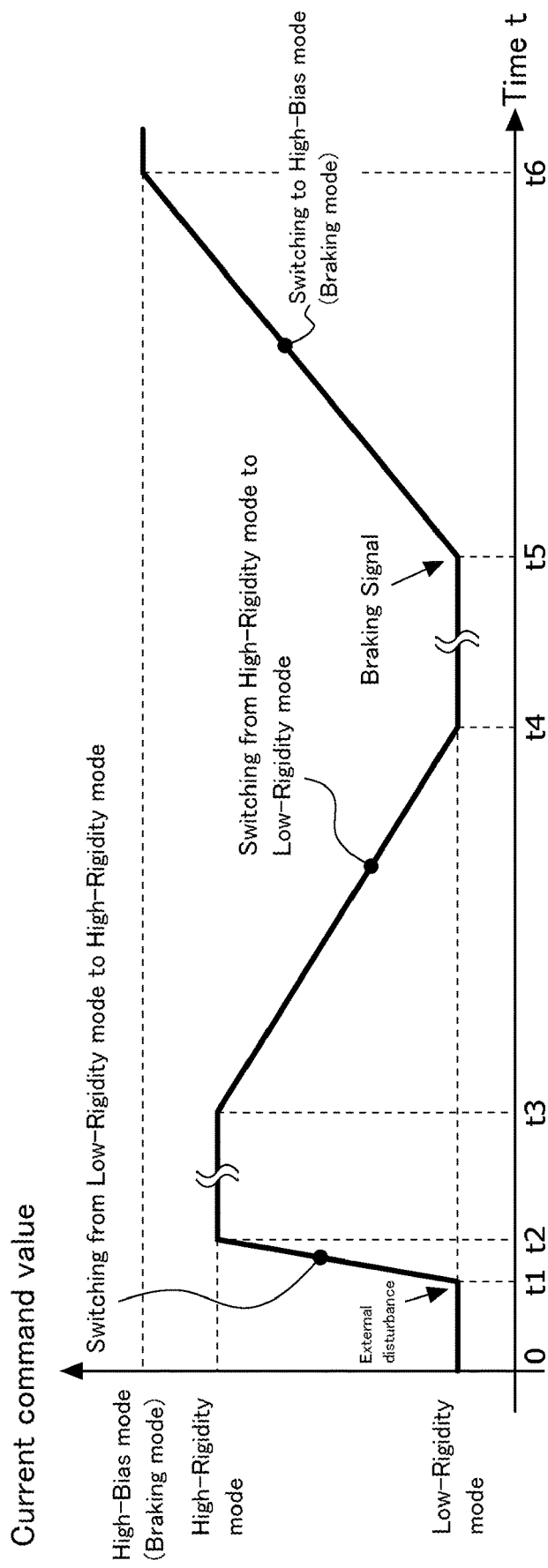
FIG. 6 indicates an example of a time chart of a current command value.

FIG. 6 indicates an example of a time chart of a current command value that is the output of the adder 27 under the above-mentioned conditions.

In FIG. 6, it is assumed that disturbance initially occurs at time t1 during an operation in the low-rigidity mode. At this point, the low-rigidity mode is instantly switched to the high-rigidity mode in a time period several times as long as the clock width of a PWM frequency of several tens kHz. The several times desirably include one to ten times. The modes are switched while β is kept at 0 and α is quickly changed from 1 to 0, leading to a linear change as indicated at, for example, time t1 to time t2 in FIG. 6. In this case, the linear change is desirably controlled so as to reduce a from, for example, 100% to 0% by 20% for each clock. The quick change is made to obtain supporting rigidity against disturbance or the like.

Slow switching may poorly suppress disturbance so as to move the rotor shaft 113 along and in contact with the bearing. Thus, the modes are desirably switched with stability in a minimum time.

The high-rigidity mode is continued from time t2 to time t3 so as to suppress disturbance. At this point, the high-rigidity mode is maintained with β and a set at 0. When the disturbance is suppressed, the mode is gradually switched to the low-rigidity mode again from time t3 to time t4. The modes are switched while 13 is set at 0 and a is gradually changed from 0 to 1 for several seconds, leading to a linear change as indicated at, for example, time t3 to time t4. In this case, the linear change is desirably controlled so as to increase a from, for example, 0% to 100% by 0.1% for each clock. The gradual change is made for several seconds in order to stabilize the control.

If disturbance occurs between time t3 and time t4, the mode is instantly switched to the high-rigidity mode as in a period between time t1 and time t2. From time t4, the low-rigidity mode is maintained while β is set at 0 and α is set at 1, so that the control is stably performed.

As described above, large disturbance can be stably suppressed and the pump can be achieved with low vibrations in a stable state. After that, when a braking signal is received at time t5, the mode is switched to the high-bias mode and β is gradually changed from 0 to 1 for several seconds, leading to a linear change as indicated at, for example, time t5 to time t6. The gradual change is made for several seconds in order to stabilize the control.

The above-mentioned control is similarly applicable to radial control and axial control. Therefore, even if large disturbance is added or the braking instruction is received in the magnetic bearing of five-axis control, the setting ratio of α and β in the low-rigidity mode, the high-rigidity mode, and the high-bias mode is changed so as to vary a PID ratio, so that stable control can be always performed according to the operating condition.

As is evident from FIG. 7, the conventional configuration includes two circuits: the amplifier circuit 15 for a low voltage and the amplifier circuit 5 for a high voltage, whereas the present invention can be configured only with one system of the power supply and the amplifier circuit 29. The current command values are added while the ratio of the current command values in the low-rigidity mode, the high-rigidity mode, and the high-bias mode is changed on a time-series basis according to the operating condition. This achieves simple control by means of software, thereby reducing the size of a substrate.

Specifically, if the parameters of the low-rigidity mode, the high-rigidity mode, and the high-bias mode are switched in the control of the present invention, a rate of change is optimally varied for each transition mode in consideration of the continuity of control. For example, during a change from high rigidity to low rigidity, the two parameters are not instantly switched and the current command values of high rigidity and low rigidity are added after being multiplied by a rate of change. The rate of change is gradually changed in each control period, making a transition to the low-rigidity mode. Thus, even if it is necessary to change the control system, the control hardly becomes unstable because the rate of change is gradually varied. The rate of change is optimally varied for each transition mode and thus power consumption and heat generation can be suppressed.

Moreover, in the control of the present invention, the high-bias steady-state current can be gradually passed in the high-bias mode so as to be regenerated and consumed by the magnetic bearing without a braking resistor, thereby shortening the braking time.

The present invention is also applicable to switching other than the rigidity switching. For example, even if completely different kinds of control are combined, stable control switching can be achieved by changing the setting ratio.

The present invention can be modified in various ways without departing from the scope of the present invention. The present invention is naturally extended to the modifications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump comprising:
   a rotating body supported and floated in air by an electromagnet;
   a position sensor that detects a radial or axial position of the rotating body;
   a subtractor that computes a difference between the position detected by the position sensor and a displacement command value;
   high-rigidity-mode adjusting means that performs control with a large control gain based on an output of the subtractor wherein an output signal of the high-rigidity-mode adjusting means is produced based on a first ratio;
   low-rigidity-mode adjusting means that performs control with a small control gain based on the output of the subtractor wherein an output signal of the low-rigidity-mode adjusting means is produced based on the first ratio;

output-signal adding means that adds the output signal produced by the low-rigidity-mode adjusting means to the output signal produced by the high-rigidity-mode adjusting means to produce an adding means output signal; and amplifying means that amplifies the adding means output signal to produce an amplifying means output signal, wherein current is passed through a winding of the electromagnet based on the amplifying means output signal.

2. The vacuum pump according to claim 1, further comprising high-bias-mode adjusting means that adjusts the output of the subtractor to a high bias when a braking signal of the rotating body is input to produce a high-bias-mode output signal, wherein the high-bias-mode output signal and the adding means output signal are adjusted based on a second ratio and the adjusted signals are input to the amplifying means.

3. The vacuum pump according to claim 2, wherein switching is performed for at least one second from the adjustment by the high-rigidity-mode adjusting means to the adjustment by the low-rigidity-mode adjusting means or from the adjustment by the high-rigidity-mode adjusting means or the adjustment by the low-rigidity-mode adjusting means to the adjustment by the high-bias-mode adjusting means.

4. The vacuum pump according to claim 2, wherein:

the output signal produced by the high-rigidity-mode adjusting means is produced by adding a steady-state current set for high rigidity to a signal that is outputted from the subtractor and is PID-controlled, the output signal produced by the low-rigidity-mode adjusting means is produced by adding a steady-state current set for low rigidity to a signal that is outputted from the subtractor and is PID-controlled, and the high-bias-mode output signal is produced by adding a steady-state current set for high bias to a signal that is outputted from the subtractor and is PID-controlled.

5. The vacuum pump according to claim 4, wherein a magnitude relationship among the steady-state currents is set such that the steady-state current set for low rigidity is at most the steady-state current set for high rigidity and the steady-state current set for high rigidity is smaller than the steady-state current set for high bias.

* * * * *